Dec. 20, 1949         T. CARVEL         2,491,852
APPARATUS FOR AGITATING AND DISPENSING FROZEN FOODS
Filed Oct. 6, 1947         3 Sheets-Sheet 1
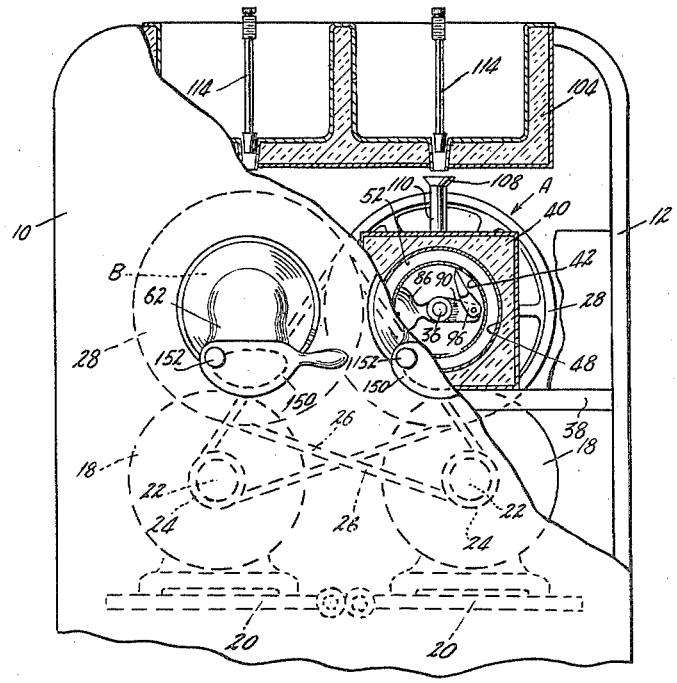
FIG. 1
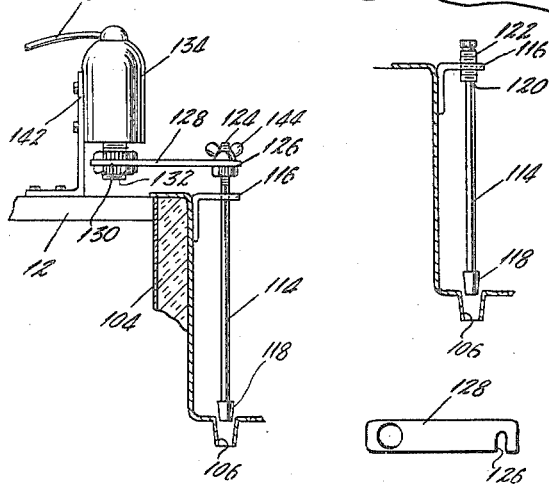
FIG. 2
FIG. 3     FIG. 4
INVENTOR.
THOMAS CARVEL
BY
Schames and Liberman
ATTORNEYS

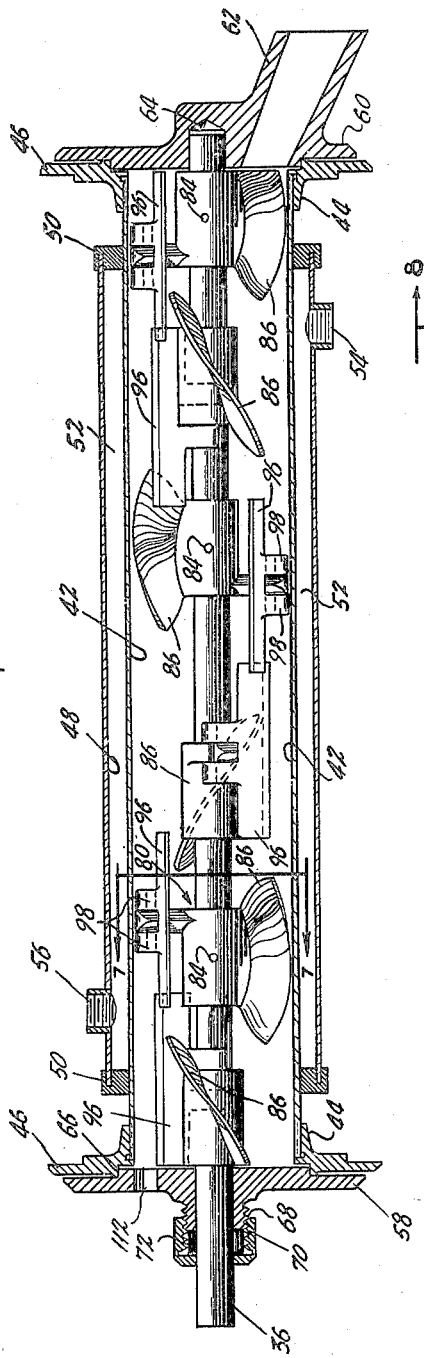
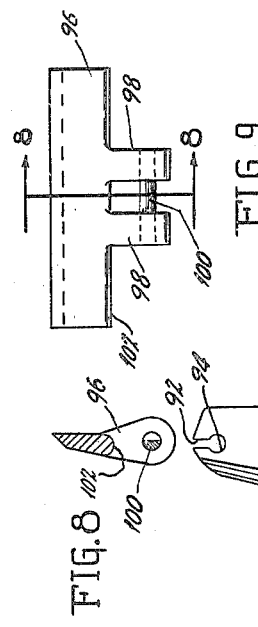
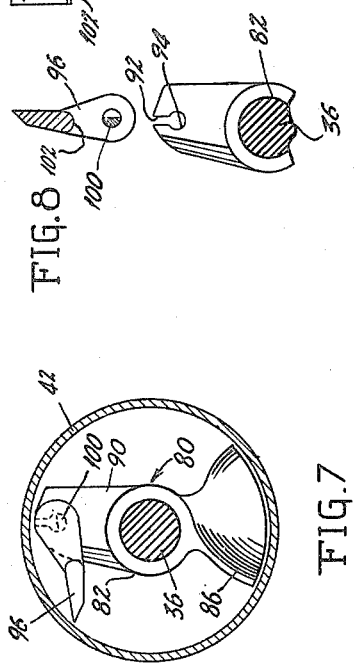

Patented Dec. 20, 1949

2,491,852

UNITED STATES PATENT OFFICE 2,491,852

APPARATUS FOR AGITATING AND DISPENSING FROZEN FOODS

Thomas Carvel, Hartsdale, N. Y.

Application October 6, 1947, Serial No. 778,213

6 Claims. (Cl. 198—213)

The present invention relates generally to apparatus for handling such foods as frozen custard, ice creams and the like foods. More specifically, my invention relates to an apparatus for cold treatment of such foods and for extruding same in semi-solid condition. These will hereinafter be referred to as "soft foods."

The main object of the present invention is the provision of an apparatus for treating such soft foods as above referred to during the formation thereof, and for extruding same.

An associated major object of the present invention is the provision of a device for treating and extruding soft foods, which comprises a hollow cylinder and a rotatable shaft therewithin, on which shaft is mounted a plurality of overlapping propeller blades to advance the foods toward the outlet port, and scraper blades to remove the foods from the cylinder walls and place same in the path of the propeller blades.

Another object of the present invention is the provision of a combined propeller and scraper blade, the blade component being removably socketed on the opposite side of the device from the propeller component.

Still another object of the present invention is the provision of an extrusion unit comprising a hollow cylindrical casing, a rotatable shaft centrally and longitudinally disposed therewithin, and a plurality of propeller and scraper units on the shaft, the sweep of scraper units overlapping the sweep of the propeller units.

Still another object of the present invention is the provision of a device for scraping material from the inner walls of a hollow cylinder which comprises a rotating shaft, a plurality of sleeve members threaded on the shaft, a propeller on one side of each sleeve, and a scraper on the opposite side thereof, the scraper having a removable blade element keyed thereinto.

Other, further and more specific objects of the present invention will in part be obvious and still others will be pointed out specifically in connection with the following description of an illustrative embodiment thereof.

In the drawings annexed hereto and forming a part hereof:

Figure 1 is a front view, partly broken away and partly in section, of one form of apparatus constructed according to and embodying my invention;

Figure 2 is a part elevational, part sectional view, illustrating the manually adjustable flow regulating valve;

Figure 3 is a similar section illustrating a thermostatically controlled flow mixing valve;

Figure 4 is a plan of a pivoting key bar for securing the thermostatically controlled valve to the valve stem;

Figure 6 is a longitudinal section through the freezing barrel component of my invention, the propeller and scraper elements being illustrated in elevation;

Figure 7 is a section on the line 7—7 of Fig. 6;

Figure 8 is an exploded view of the scraper knife blade and socket therefor, the knife blade being shown in section on the line 8—8 of Fig. 9; and Figure 9 is a side elevational view of the scraper blade.

Figure 1 illustrates an embodiment of my invention wherein two identical units, A and B, are disposed within casing 10. I will hereinafter, however, describe the structure and operation of one of the units, A, it being understood that the other unit, B, is identical therewith.

Figure 5:
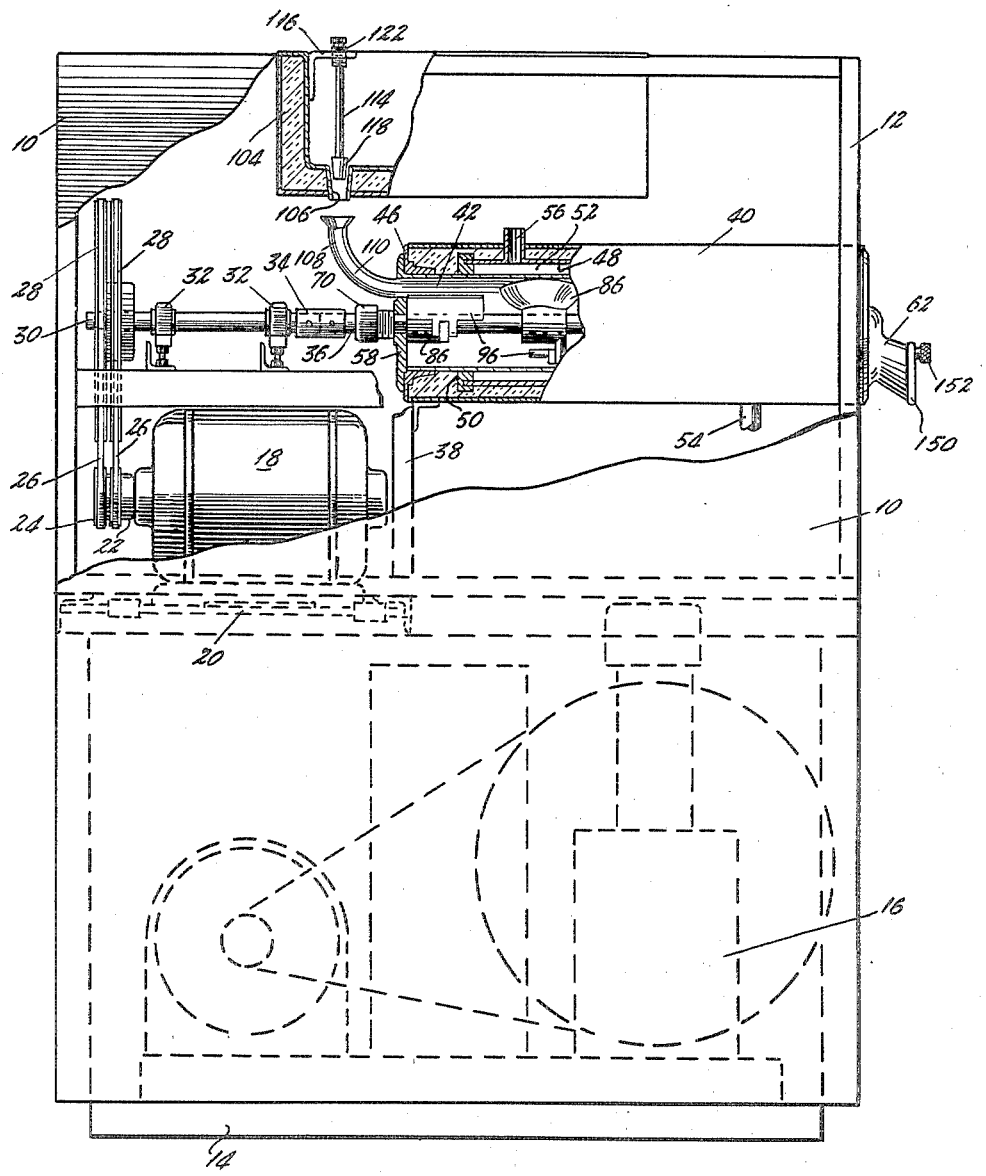
Figure 5 is a side elevational view of the machine also partly broken away and partly sectioned to illustrate internal construction and arrangement of parts.

Casing 10 is supported by frame 12 resting on a suitable platform 14. In the lower portion of casing 10 there is disposed a refrigeration unit 16 of conventional character. In the upper portion of casing 10, at the rear thereof, I mount a motor 18 on a suitable socket support 20. The motor shaft 22 is provided with an annularly grooved pulley wheel 24 and is connected by belt 26 to an annularly grooved pulley wheel 28 mounted on the outer end of a shaft extension 30. The shaft extension 30 is supported along its length by a pair of pillow blocks 32, 32. The inner end of shaft extension 30 is coupled as at 34 to the main shaft 36. Resting atop a suitable support as 38 in the upper front part of casing 10 is an insulating box 40 of square cross section, as shown in Fig. 1. A hollow cylinder 42 is disposed within box 40, supported therewith as by inwardly shouldered portions 44 of flange end members 46, 46. The major part of cylinder 42 is surrounded by a spaced cylinder 48 supported at its ends by head portions 50, 50. As seen in Figs. 5 and 6, the terminal ends of the inner cylinder 42 project beyond the outer cylinder 48, the space 52 between the cylinders defining a jacket for the passage of a refrigerant around inner cylinder 42. The refrigerant is piped from unit 16 into jacket 52 through inlet 54 at the front bottom of the box and out therefrom through exit exit part 56 at the rear top of the box, via suitable piping.

Shaft 36 extends through inner cylinder 42 from the rear thereof and is supported by head plate 58 at the rear of the cylinder and at the front thereof by another head plate as 60, differently shaped as to provide a discharge spout 62 and a centrally located socketed recess 64, to receive the end of shaft 36 therewithin. Flange 46 is recessed as at 66, plate 58 fitting thereinto in fluid-tight relationship. As seen in Fig. 6, the center of plate 58 is shouldered rearwardly and threaded as at 68, and a gland nut 70 screw fitted thereover as to compress the intermediately placed packing 72 and thereby insure a fluid-tight fit about rotating shaft 36.

I provide, and mount on shaft 36, a plurality of specially prepared elements 80, 80 which are one of the main features of the present invention, to wit, combined propeller and scraper members. These are best illustrated in Figs. 6 to 9 inclusive. Each member 80 comprises a central collar portion 82 of such internal diameter as to slidably fit about shaft 36. The member 80 may be locked on shaft 36 at any desired point thereon by means of a set screw as indicated at 84. Extending outwardly from one side of collar 82 is a curved propeller blade 86, the outer margin of which is curved on a circle whose radius is very slightly smaller than the inner radius of cylinder 42. Propeller blades 86, 86 are so biased that on rotation thereof, material within cylinder 42 will be moved from left to right along the length of cylinder 42 as in Figs. 5 and 6. Extending outwardly and radially from collar 82, and on the aspect thereof opposite blade 86, is an arm 90, which is axially slitted from the top thereof as at 92, slit 92 communicating with a circular opening 94. A scraper member 96 is provided having a pair of downwardly extended legs 98, 98 which are spaced apart a distance slightly greater than the thickness of arm 90 so as to straddle same. Extending across legs 98, 98 is a half-round shaft 100 of such thickness as to slidably fit through notch 92 into the semi-circular recess 94. As illustrated in Figure 8, when the straight side of shaft 100 is axially aligned with the scraper blade component 102, the scraper member can then be fitted onto arm 90 in axial alignment. Of course, as will be obvious, when the scraper arm is flipped over into the position shown in Fig. 7, and the assembly disposed within cylinder 42, the scraper element becomes locked against removal. Also, the extent to which the scraper may be flipped or swung over is limited by the contact of the lower edge of blade 102 against the side of arm 90, and is preferably so adjusted that the edge of the scraper makes sliding contact with the inside of the cylinder 42. As seen in Fig. 6, arm 90 extends from collar 82 at one end thereof, and the scraper blades, preferably of length longer than propeller blades 86, extend beyond their associated propeller members. Elements 80, 80 are spaced along the length of shaft 36 inside cylinder 42 as to have the scraper of one element 80 lap over the sweep of the propeller of the adjacent elements 80, 80.

The food mix, in liquid form, is charged into insulated tanks 104 at the upper portion of the casing 10, from which it flows, by gravity through tapered outlet 106, into funnel 108 and thence, via piping 110 into cylinder 42 through opening 112 in plate 58.

The rate of flow of the mix from tank 104 into cylinder 42 may be controlled either manually, as in Figs. 1, 2 and 5, or thermostatically as in Figs. 3 and 4. Referring to the manually operated mix flow valve illustrated in Figs. 1, 2 and 5, an elongated rod 114 vertically supported by a bracket 116 is provided with a tapered seat 118 at its bottom. The upper end of rod 114, extending upwardly of the casing, is threaded as at 120 and a threaded bolt 122 engaged therewith serves to raise or lower the seat portion 118 out of or into tapered outlet 106. The thermostatic control illustrated in Figs. 3 and 4, comprises a similar elongated rod 114 vertically supported by a bracket 116, and having a tapered seat portion 118 at its lower end. The upper end 124 of rod 114 is engaged by the free notched end 126 of swinging arm 128, the other end 130 thereof being pivotally connected to the bellows portion 132 of a thermostat 134. Thermostat 134 is connected to the freezer cylinder 42 as by tubing 140, and the temperatures therein will automatically control the rise and fall of valve stem 114 and plug seat 118. The thermostat 134 may be supported upwardly of the device by a suitable bracket 142, and adjustments for the length of the stroke of rod 114 may be made by a wing nut 144.

The delivery spout 62 on plate 60, may be closed by a swinging door 150 pivoted on one side as at 152, so that during operation of the machine, the contents may be permitted to be discharged to any desired extent.

My apparatus is of relatively simple construction, and easy to operate. The assembly of the propeller-scraper units on the main shaft present no particular difficulty, and the shaft with the propeller-scrapers thereon can be removed from the inner cylinder as a unit, upon removal of plate 58. The shaft may be rotated in use at about 435 R. P. M. at a temperature within the freezing cylinder 42 of 18° to 20° F., the propeller blades whipping the mix while the temperature is low, freezing same, the scraper blades throwing material adhering to the cylinder sides inwardly in the path of the propellers.

I claim:

1. An apparatus of the character described comprising an elongated hollow cylinder, an elongated shaft extending therethrough centrally thereof, means to rotate said shaft, a plurality of collar members mounted on said shaft along the length thereof for rotation therewith, propeller means extending radially from said collar on one side thereof, and scraper means extending radially from said collar on the opposite side thereof and reaching at least on one side beyond the edge of the propeller blade, the effective and operative radial length of the propeller and of the scraper being slightly less than the internal diameter of the cylinder, whereby the scraper means will remove material adhering to the cylinder over its internal circumference into the path of the propeller means.

2. An apparatus as in claim 1, in which the propeller is integral with the collar, and the scraper blade is removably secured to the collar.

3. Apparatus as in claim 1, in which the propeller is integral with the collar, and the scraper comprises a base and a blade, the blade being removable and extending axially of the cylinder, when in position on the base, beyond the edge of the propeller on one side thereof.

4. An apparatus of the character described comprising an elongated hollow cylinder, smooth surfaced on the interior thereof an inlet port at one end thereof, an exit port at the opposite end thereof, means within the cylinder to agitate material introduced thereinto and advance same along the cylinder length from the inlet to the exit end thereof, which means comprise an elongated rotatable shaft disposed longitudinally and centrally of the cylinder, a plurality of collar members mounted on said shaft and spaced along the length thereof, a propeller blade on and extending from each of the collars radially to an operative position in respect of the cylinder wall, an arm on and extending radially from each of the collars on the side thereof opposite the propeller, and a scraper blade removably mounted in said arm to bear operatively against the cylinder wall throughout its internal circumference.

5. An apparatus as in claim 4, in which the arm is axially slotted and the blade has a cooperating portion which fits into said slot when in axial alignment therewith, and which, when angulated with respect to said slot positioning same operatively against the inner surface of the cylinder, locks the blade against removal therefrom.

6. An apparatus as in claim 5, in which the outer edge of the propeller is spirally curved and the outer edge of the scraper is straight, lengthwise of the cylinder.

THOMAS CARVEL.

REFERENCES CITED

The following references are of record in the file of this patent:

UNITED STATES PATENTS

| Number | Name | Date |
|---|---|---|
| 823,262 | Collins | June 12, 1906 |

FOREIGN PATENTS

| Number | Country | Date |
|---|---|---|
| 24,549 | Switzerland | June 11, 1902 |